US009046652B2

(12) United States Patent
Whinnery et al.

(10) Patent No.: US 9,046,652 B2
(45) Date of Patent: Jun. 2, 2015

(54) MIRROR ASSEMBLY AND VEHICLES INCLUDING SAME

(71) Applicant: Honda Motor Co., Ltd., Tokyo (JP)

(72) Inventors: Joseph P. W. Whinnery, Marysville, OH (US); Brian K. Lickfelt, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 283 days.

(21) Appl. No.: 13/663,007

(22) Filed: Oct. 29, 2012

(65) Prior Publication Data
US 2014/0118855 A1    May 1, 2014

(51) Int. Cl.
*G02B 7/18*   (2006.01)
*G02B 7/198*  (2006.01)
*B60R 1/072*  (2006.01)
*G02B 27/00*  (2006.01)

(52) U.S. Cl.
CPC ............... *G02B 7/198* (2013.01); *B60R 1/072* (2013.01); *G02B 27/0093* (2013.01)

(58) Field of Classification Search
CPC ........ B60R 1/02; B60R 1/106; B60R 1/0612; B60R 1/066; B60R 1/07; B60R 1/072; B60R 1/074; B60R 1/078

USPC .................................. 359/841, 842, 843, 872
See application file for complete search history.

(56) References Cited

U.S. PATENT DOCUMENTS

| 5,706,144 A | 1/1998 | Brandin |
| 5,949,592 A * | 9/1999 | Brandin ........................ 359/843 |
| 6,176,587 B1 | 1/2001 | Fredricks |
| 6,397,137 B1 | 5/2002 | Alpert et al. |
| 6,830,351 B2 | 12/2004 | Newcomb |
| 2006/0092534 A1 | 5/2006 | Ivanov |

\* cited by examiner

*Primary Examiner* — Euncha Cherry
(74) *Attorney, Agent, or Firm* — Clifford B Vaterlaus

(57) ABSTRACT

A vehicle includes a body structure, a mirror assembly, a controller, and a position sensor. The mirror assembly includes a mirror housing, housing motor, and mirror. The housing motor is operably coupled with the mirror housing and the body structure and is configured to facilitate movement of the mirror housing relative to the body structure. The controller is in electrical communication with the housing motor. The position sensor is in electrical communication with the controller. The controller is configured to detect a position of a rider of the vehicle and to facilitate selective operation of the housing motor to result in movement of the mirror housing to correspond with the detected position of the rider.

20 Claims, 9 Drawing Sheets

MIRROR ASSEMBLY AND VEHICLES INCLUDING SAME

TECHNICAL FIELD

Vehicles are provided which include a mirror assembly. The mirror assembly includes a mirror housing and a mirror, and the mirror housing can move in automatic response to a detected position of a rider of the vehicle.

BACKGROUND

Conventional vehicular mirror assemblies include a mirror housing and a mirror. A mirror motor is coupled with each of the mirror housing and the mirror. The mirror motor is associated with a control device that facilitates selective positioning of the mirror by an operator.

SUMMARY

In accordance with one embodiment, a vehicle comprises a body structure, a first mirror assembly, a controller, and a position detector. The first mirror assembly comprises a first mirror housing, a first housing motor, and a first mirror. The first mirror is coupled with the first mirror housing. The first housing motor is operably coupled with the first mirror housing and the body structure. The first housing motor is configured to facilitate movement of the first mirror housing with respect to the body structure. The controller is in electrical communication with the first housing motor. The position sensor is in communication with the controller and is configured to sense position data relating to a rider of the vehicle. The controller is configured to detect a position of a rider from the position data and to facilitate selective operation of the first housing motor to result in movement of the mirror housing to correspond with the detected position of the rider.

In accordance with another embodiment, a saddle-type vehicle comprises a body structure, a mirror assembly, a controller, a position sensor, and a transmitter. The mirror assembly comprises a mirror housing, a housing motor, a mirror, and a mirror actuator. The housing motor is operably coupled with the mirror housing and the body structure. The housing motor is configured to facilitate movement of the mirror housing with respect to the body structure. The mirror actuator is operably coupled with the mirror housing and the mirror and is configured to facilitate movement of the mirror with respect to the mirror housing. The controller is in electrical communication with each of the housing motor and the mirror actuator. The transmitter is configured for coupling with a rider and is further configured to emit a position signal. The position sensor is in electrical communication with the controller and is configured to receive the position signal. The controller is configured to detect a position of a rider of the saddle-type vehicle from the position signal and to facilitate selective operation of at least one of the housing motor and the mirror actuator to result in movement of at least one of the mirror housing and the mirror to correspond with the detected position of the rider.

In accordance with yet another embodiment, a method for positioning a mirror assembly of a saddle-type vehicle is provided. The method comprises sensing position data relating to a rider of the saddle-type vehicle and detecting a position of the rider from the position data. The method further comprises operating a housing motor, the housing motor being operably coupled with a mirror housing and a body structure. The method still further comprises operating a mirror actuator, the mirror actuator being operably coupled with the mirror housing and a mirror. Operating the housing motor and the mirror actuator occurs in automatic response to detection of a change of position of the rider.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION

Embodiments are hereinafter described in detail in connection with the views of FIGS. 1-9, wherein like numbers indicate the same or corresponding elements throughout the views. A vehicle includes one or more mirror assemblies which can facilitate an operator's viewing of an area rearward of the vehicle. In one embodiment, the vehicle can comprise a saddle-type vehicle, such as a motorcycle 10 shown in FIGS. 1-9. In other embodiments, a saddle-type vehicle can comprise an all terrain vehicle, a personal watercraft, a scooter, or a bicycle, for example. In another embodiment, the vehicle can comprise a non-saddle-type vehicle such as an automobile, for example.

Figure 1:
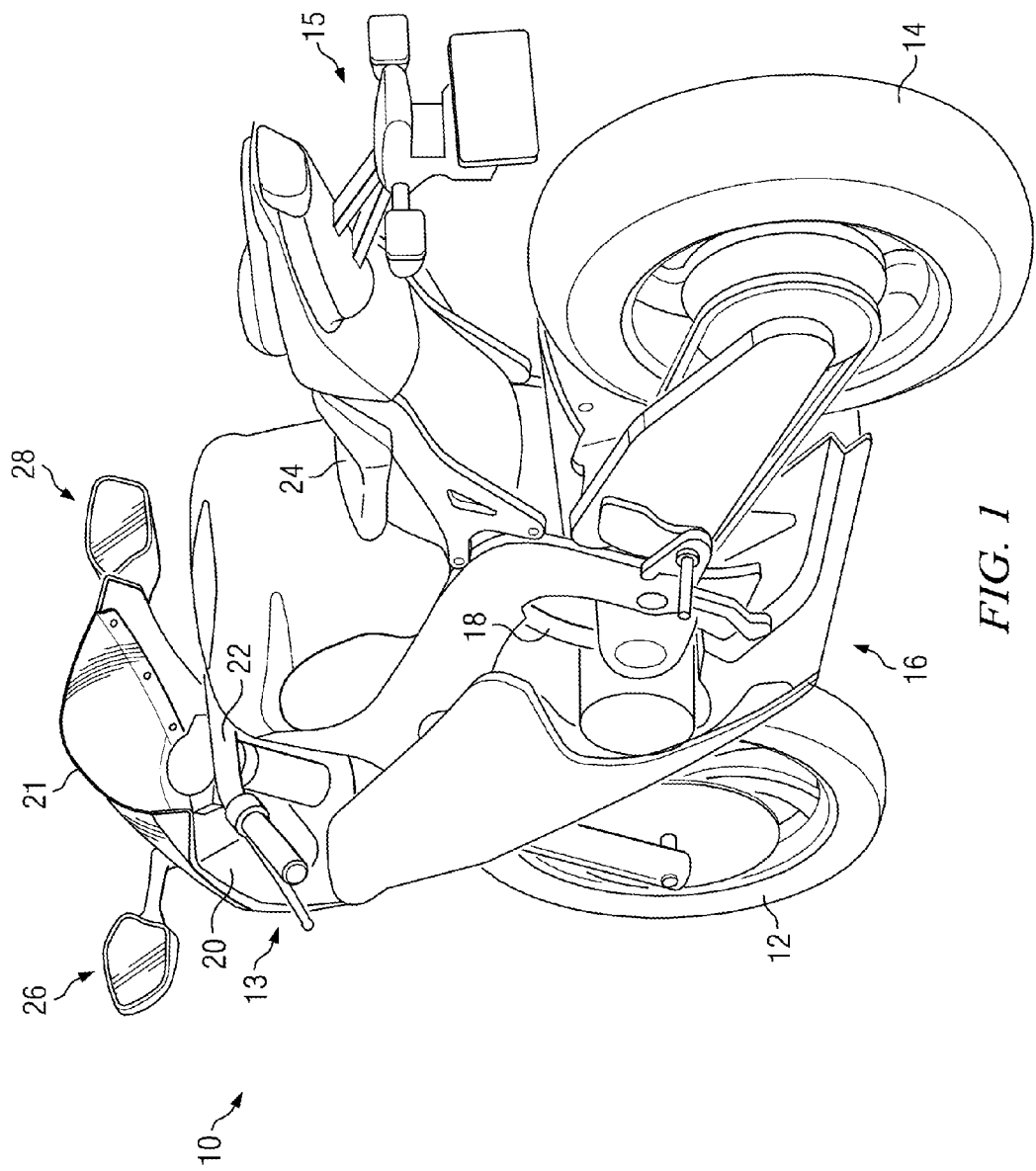
FIG. 1 is a left rear perspective view depicting a motorcycle including a left side mirror assembly and a right side mirror assembly, in accordance with one embodiment.

As illustrated in FIG. 1, the motorcycle 10 can include a front wheel 12 and a rear wheel 14 which are each rotatably supported with respect to respective front and rear ends 13, 15 of a body structure 16. In one embodiment, the body structure 16 can include a frame 18. The body structure 16 can also include body panels, such as a front faring 20 and a windshield 21, which can be supported by the frame 18. The motorcycle 10 can include a pair of handlebars 22 that are coupled with the front wheel 12 to facilitate steering of the front wheel 12 by a rider. A seat 24 can be provided that is configured to support a rider within reach of the handlebars 22.

Figure 2:
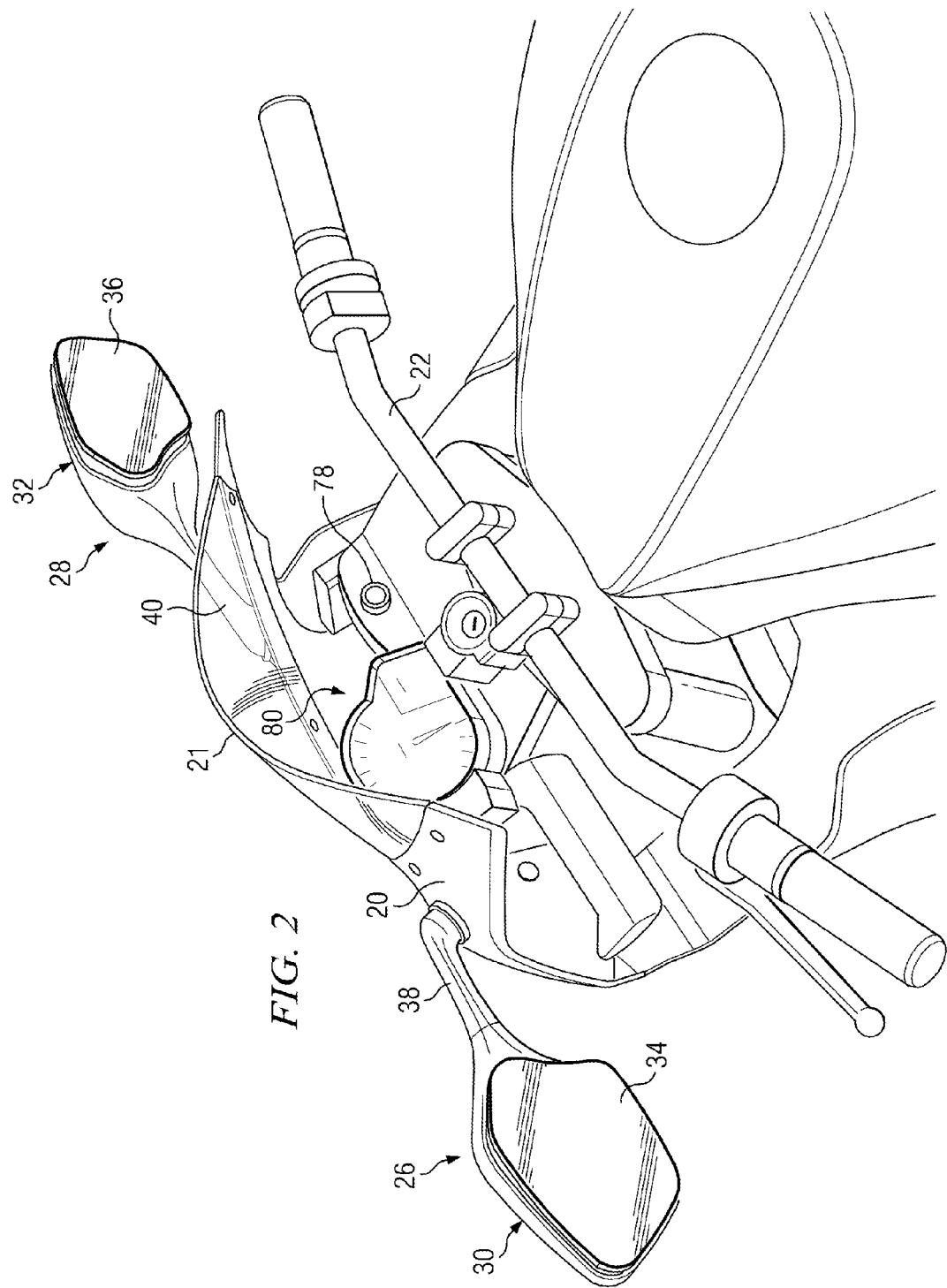
FIG. 2 is an enlarged left rear perspective view depicting a front end of the motorcycle of FIG. 1.

The motorcycle 10 can include one or more mirror assemblies that allows a rider to view an area rearward of the motorcycle 10. In one embodiment, as illustrated in FIGS. 1 and 2, the motorcycle 10 can include a left side mirror assembly 26 and a right side mirror assembly 28. As illustrated in FIG. 2, the left side mirror assembly 26 can include a left mirror housing 30 and a left mirror 34. Additionally, the right side mirror assembly 28 can include a right mirror housing 32 and a right mirror 36. The left and right mirror housings 30, 32 can be configured to move relative to the body structure 16 of the motorcycle 10. In one embodiment, the left and right mirror housings 30, 32 can include, and can be supported with respect to the body structure 16 by, respective left and right stem portions 38, 40. Each of the left and right stem portions 38, 40 can be coupled with the front faring 20 of the motorcycle 10 to support the left and right mirror housings 30, 32 at the front end 13 of the motorcycle 10.

The left and right mirrors 34, 36 can be configured to move relative to the respective left and right mirror housings 30, 32. In one embodiment, the left and right mirrors 34, 36 can be coupled with the respective left and right mirror housings 30, 32 by a spheroidal joint (e.g., a ball and socket joint). In such an embodiment, each of the left and right mirrors 34, 36 can be pivoted in any direction with respect to the left and right mirror housings 30, 32. It will be appreciated that a mirror assembly can be provided in any of a variety of suitable alternative arrangements that may or may not facilitate movement of a mirror relative to a mirror housing. It will also be appreciated that a mirror system of a vehicle can include any of a variety of suitable alternative or additional mirror assemblies. For example a mirror system of a vehicle can include a rear view mirror that is laterally centrally disposed upon a vehicle, such as an automobile, and can be mounted to a windshield.

Figure 3:
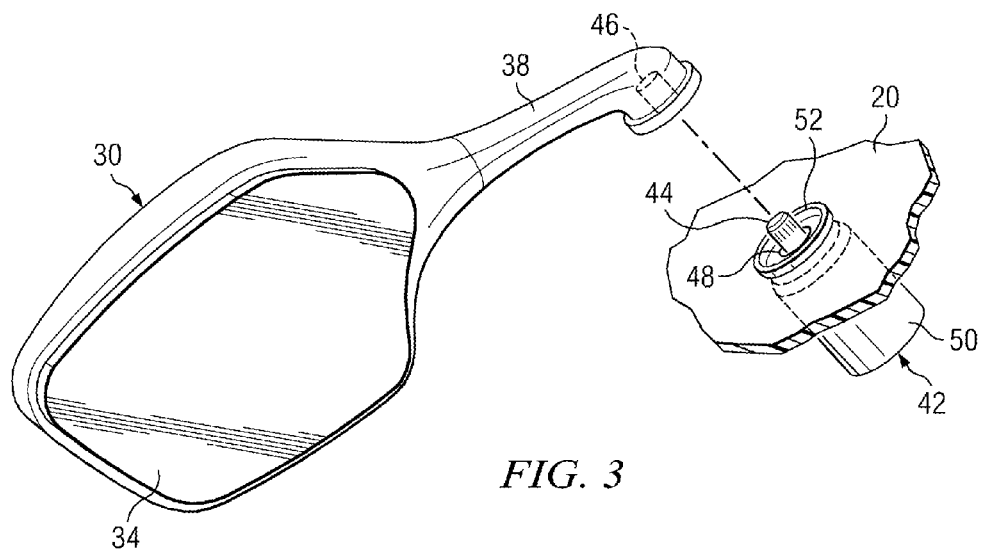
FIG. 3 is a partially exploded perspective view depicting the left side mirror assembly in association with a portion of a faring of the motorcycle of FIG. 1.

With reference to FIG. 3, the left side mirror assembly 26 can include a left mirror housing motor 42 that is operably coupled with the left mirror housing 30 and the body structure 16. The left mirror housing motor 42 can be configured to facilitate movement of the left mirror housing 30 with respect to the body structure 16. In one embodiment, as illustrated in FIG. 3, the left mirror housing motor 42 can include a rotary motor that includes a splined shaft 44. The left mirror housing 30 can comprise a splined receptacle 46 that is disposed within the left stem portion 38 and is configured for mating engagement with the splined shaft 44. The left mirror housing motor 42 can be coupled with the body structure 16 such that, when the splined shaft 44 is inserted into the splined receptacle 46, operation of the left mirror housing motor 42 can pivot the left mirror housing 30 with respect to the body structure 16. In one embodiment, a stator or body 50 of the left mirror housing motor 42 can be disposed beneath the front faring 20 with the splined shaft 44 extending through respective apertures (e.g., 48) that are defined by the front faring 20 and a spacer 52. The portion of the front faring 20 adjacent to the aperture 48 can be sandwiched between the spacer 52 and the body 50 of the left mirror housing motor 42. When the splined shaft 44 of the left mirror housing motor 42 is inserted into the splined receptacle 46, the spacer 52 can interact with the left stem portion 38 of the left mirror housing 30 to conceal the left mirror housing motor 42 and accordingly maintain attractive aesthetics for the interface between the left side mirror assembly 26 and the front faring 20.

The right side mirror assembly 28 can also include a right mirror housing motor (e.g., 43 in FIG. 6) that is similar in many respects to the left mirror housing motor 42 but is provided at a right side of the front faring 20 of the motorcycle 10. The right mirror housing 32 can accordingly be configured to interact with the right mirror housing motor (e.g., 43) in a similar manner as described herein with respect to the left side mirror assembly 26. It will be appreciated that any of a variety of suitable alternative housing motor arrangements can be provided that facilitates movement of a mirror housing with respect to a body structure of a vehicle.

Figure 4:
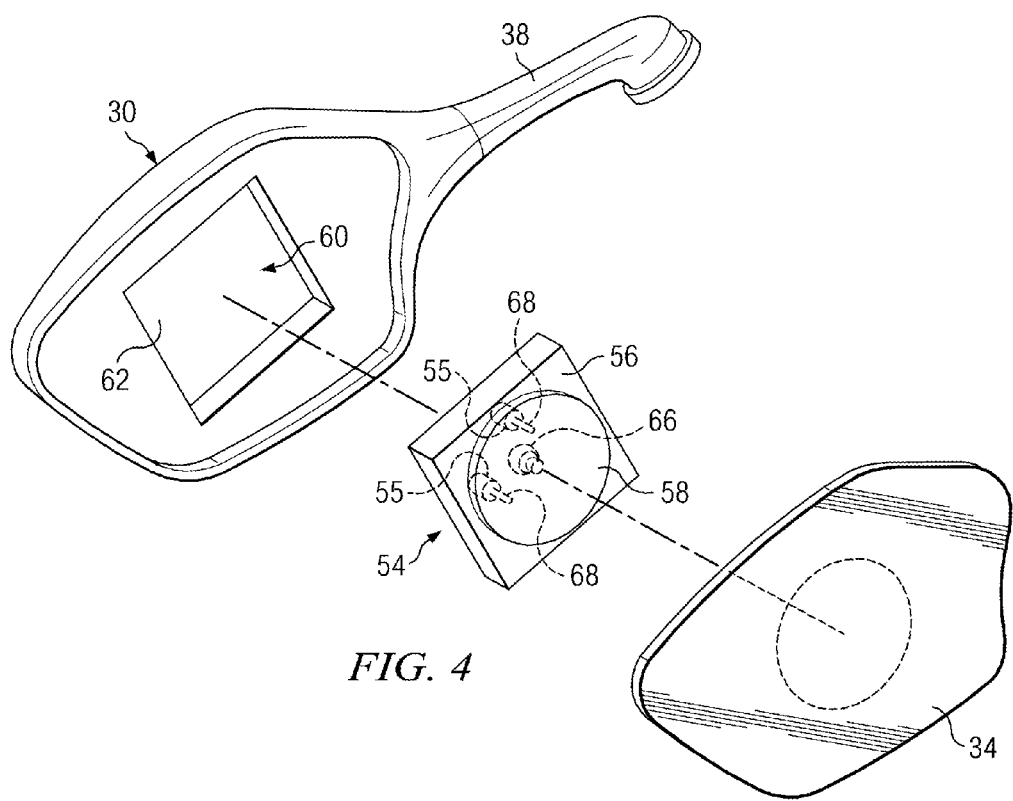
FIG. 4 is an exploded view depicting a portion of the left side mirror assembly of FIG. 3.

Referring now to FIG. 4, the left side mirror assembly 26 can also include a left mirror actuator 54 that is operably coupled with the left mirror housing 30 and the left mirror 34. The left mirror actuator 54 can be configured to facilitate movement of the left mirror 34 with respect to the left mirror housing 30. The left mirror actuator 54 can include a base 56 and a mirror support 58 which is movably coupled to the base 56 by way of a pivot 66. The left mirror housing 30 can define a recess 60 that includes a mounting surface 62. The base 56 can be coupled with the mounting surface 62 (e.g., with bolts and/or adhesives) and the left mirror 34 can be coupled with the mirror support 58 (e.g., with adhesive) such that the left mirror actuator 54 is concealed from view through cooperation of the left mirror housing 30 and the left mirror 34. The left mirror actuator 54 can include a pair of motors 55 having fixed portions coupled with the base 56. Rotatable shafts 68 of each of the motors 55 can be threaded into respective threaded apertures provided in the mirror support 58. The motors 55 can be selectively and independently operated to facilitate pivoting of the left mirror 34 with respect to the left mirror housing 30.

The right side mirror assembly 28 can also include a right mirror actuator (e.g., 57 in FIG. 6) that is similar in many respects to the left mirror actuator 54. The right mirror housing 32 and the right mirror 36 can accordingly be configured to interact with the right mirror actuator in a similar manner as described with respect to the left side mirror assembly 26.

Figure 5:
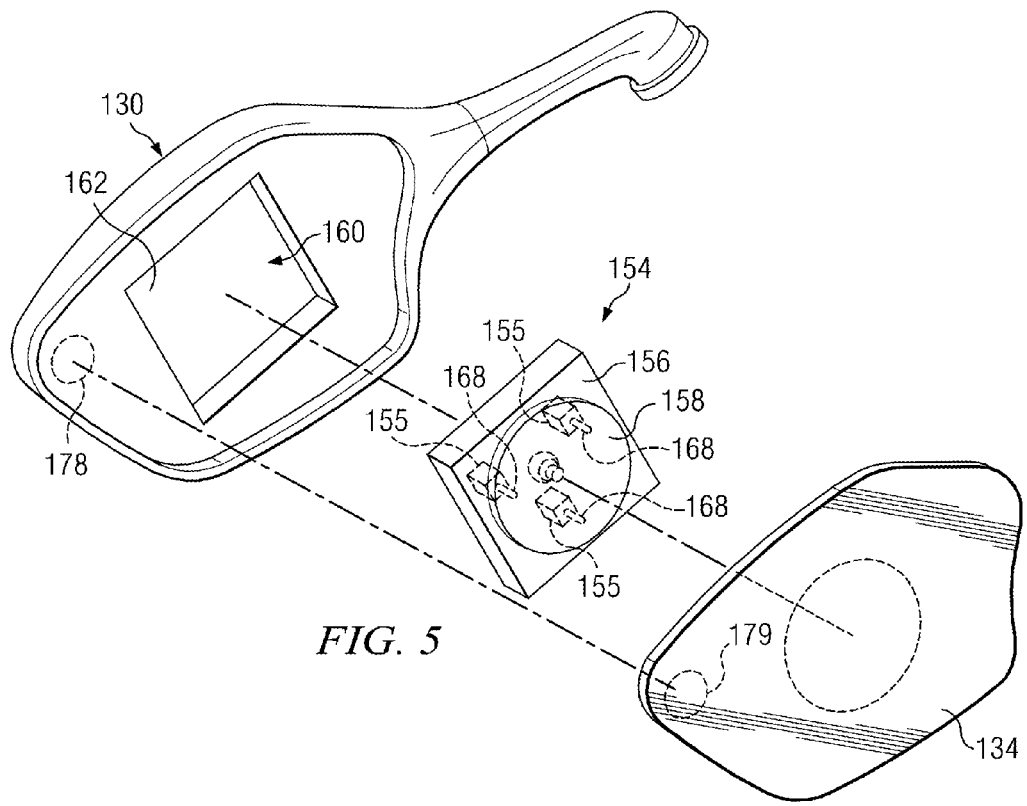
FIG. 5 is an exploded view depicting a portion of the left side mirror assembly in accordance with another embodiment.

Although the left and right mirror actuators (e.g., 54, 57) are described above to include motors, it will be appreciated that a mirror actuator can include any of a variety of alternative actuators. For example, in an alternative embodiment and as illustrated in FIG. 5, a left mirror actuator 154 can include a plurality of piezoelectric actuators 155. In such an embodiment, the left mirror actuator 154 can include a base 156 and a mirror support 158. A left mirror housing 130 can define a recess 160 that includes a mounting surface 162. The base 156 can be coupled with the mounting surface 162 (e.g., with bolts) and a left mirror 134 can be coupled with the mirror support 158 (e.g., with adhesive). The piezoelectric actuators 155 can be coupled with each of the base 156 and the mirror support 158, and can be circumferentially arranged about the mirror support 158, as generally shown in FIG. 5. Shafts 168 of each of the piezoelectric actuators 155 can be secured to a back portion of the left mirror 134 (e.g., in a press fit arrangement). The shafts 168 of the piezoelectric actuators 155 can be selectively and independently operated to pivot the left mirror 134 in any direction with respect to the base 156 and the left mirror housing 130. A right mirror actuator might also include piezoelectric actuators and the right mirror housing and the right mirror can accordingly be configured to interact with the piezoelectric actuators in a similar manner as described with respect to the left mirror housing 130. For example, a right mirror actuator can include piezoelectric actuators that are similar in many respects to the piezoelectric actuators 155 and that interact with a base and mirror support in a similar manner as described with respect to the left mirror actuator 154. It will be appreciated that any of a variety of suitable alternative mirror actuator configurations can be provided that facilitate movement of a mirror, such as with a servo motor, for example.

During operation of the motorcycle 10, vehicular disturbances, such as road and engine vibration, can be transmitted to the left and right mirrors 34, 36 (e.g., as ambient vibration), thereby affecting the ability of a rider to effectively view the area rearward of the motorcycle 10 through use of the left and right mirrors 34, 36. In one embodiment, piezoelectric actuators (e.g., 155) of a mirror actuator (e.g., 154) can be configured to dampen vibration of a mirror. With reference to the example of FIG. 5, when the left mirror housing 130 is subjected to ambient vibration (e.g., due to engine operation or road conditions), the piezoelectric actuators 155 can be actuated in a manner that counteracts the ambient vibration and stabilizes the left mirror 134 to allow an operator to view the area rearward of the motorcycle 10 through use of the left mirror 134. In some embodiments, the piezoelectric actuators 155 can be configured as self-powering units such that they can harvest energy from the ambient vibration of the motorcycle 10. Therefore, when the left mirror housing 130 is subjected to ambient vibration, the piezoelectric actuators 155 can operate to dampen the vibrations from impacting the left mirror 134. Use of piezoelectric actuators can facilitate vibration dampening of a mirror without requirement for an external power source or control system which can be bulky, expensive, and difficult to implement. In another embodiment, however, piezoelectric actuators of a side mirror assembly can be configured to attach to a battery or other external power source.

Figure 6:
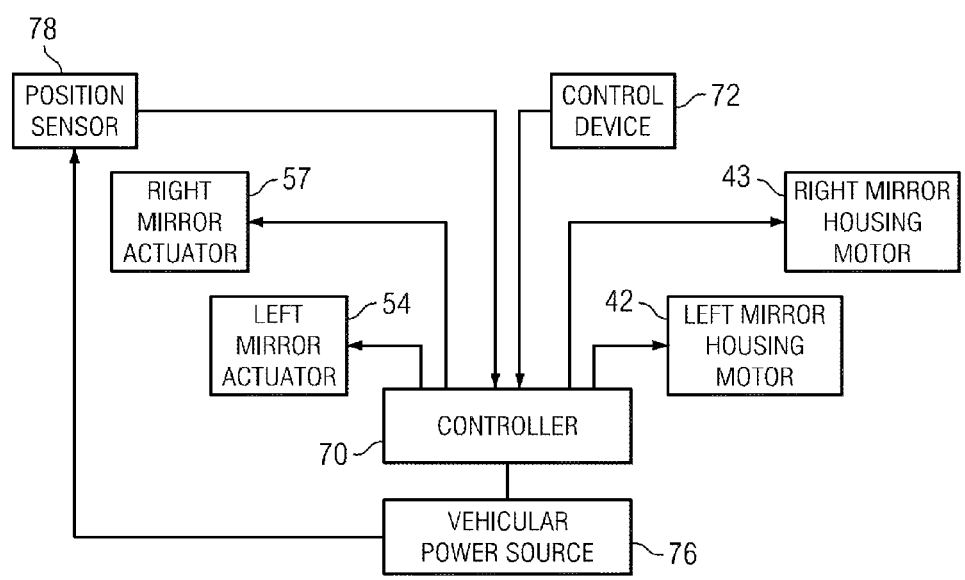
FIG. 6 is a schematic view depicting a controller associated with certain other components of the motorcycle of FIG. 1.

As illustrated in FIG. 6, the left mirror housing motor 42, the right mirror housing motor 43, the left mirror actuator 54, and the right mirror actuator 57 can each be in electrical communication with a controller 70. The controller 70 can be configured to facilitate selective operation of each of the left mirror housing motor 42, the right mirror housing motor 43, the left mirror actuator 54, and the right mirror actuator 57 to result in respective movement of the left and right mirror housings 30, 32 and the left and right mirrors 34, 36. In one embodiment, the controller 70 can facilitate operation of the left mirror housing motor 42, the right mirror housing motor 43, the left mirror actuator 54, and the right mirror actuator 57 in response to signals from a control device 72 which is in electrical communication with the controller 70 and is configured to facilitate manual powered operation of the left and right side mirror assemblies 26, 28 by an operator. The control device 72 can comprise a joystick actuator, a rocker switch assembly, pushbuttons, or any of a variety of other actuators.

The controller 70 can also be in electrical communication with a position detector 78, as illustrated in FIG. 6. As will be described in further detail below, the position detector 78 can be configured to sense position data relating to a rider. The controller 70 can be configured to detect a rider's position from the position data and to facilitate positioning of mirror housings (e.g., 30, 32) and/or mirrors (e.g., 34, 36) according to the rider's position. Although the position detector 78 is shown to be in communication with a vehicular power source 76 (e.g., a battery), it will be appreciated that the position detector 78 can be powered in any of a variety of suitable alternative embodiments. For example, piezoelectric actuators (e.g., 155) can be implemented as composite bimorphs, with two stable states. In such an arrangement, the piezoelectric actuators (e.g., 155) can provide enough power to facilitate their dampening of vibration of a mirror as previously described, while also powering the position sensor 78.

Figure 7A:
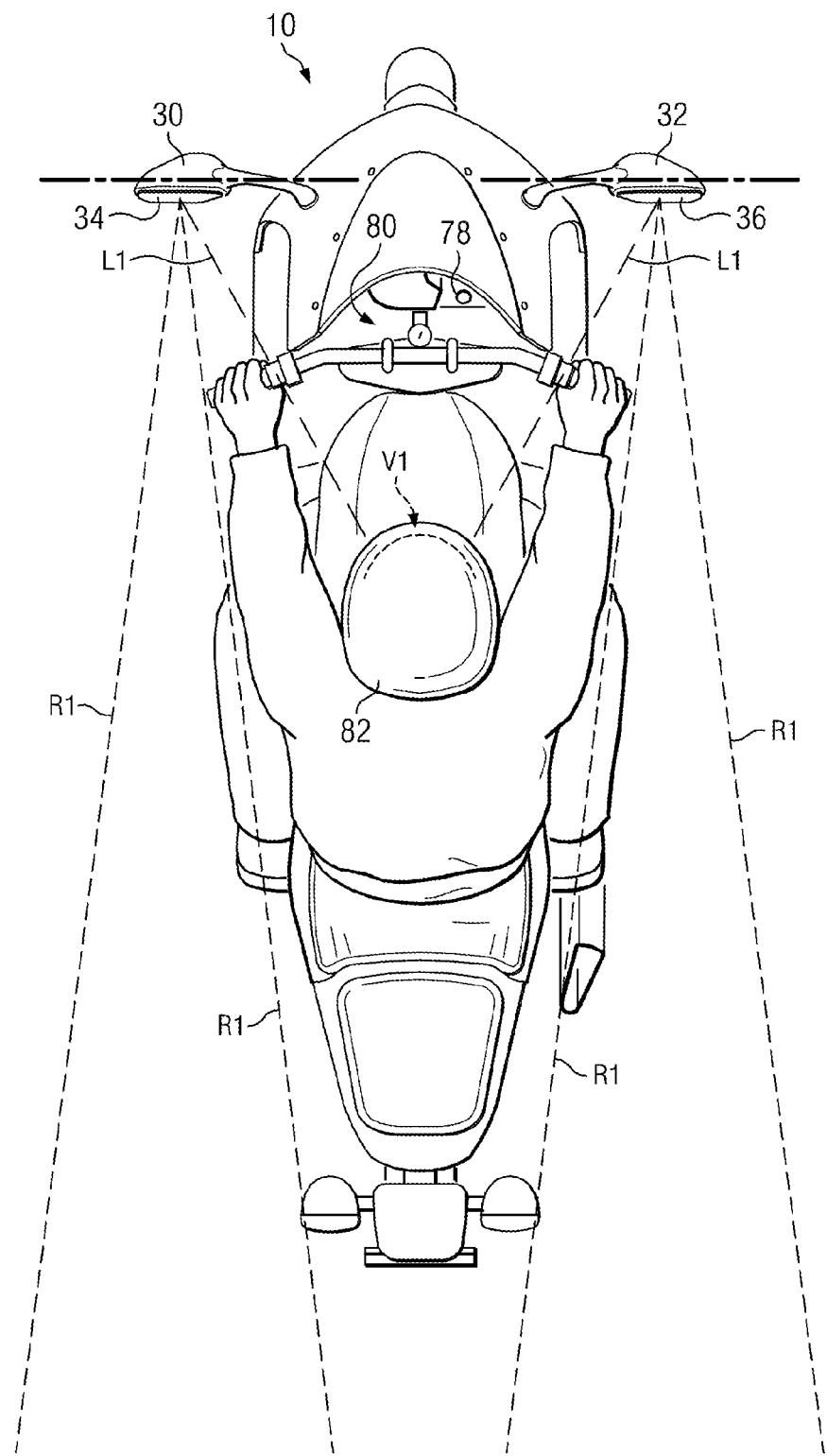
FIG. 7A is a top plan view depicting the motorcycle of FIG. 1 in association with a rider, wherein the rider is positioned on a seat of the motorcycle in an upright position, left and right mirror housings are each in a respective outward position, and left and right mirrors are each in a respective first position.
Figure 7B:
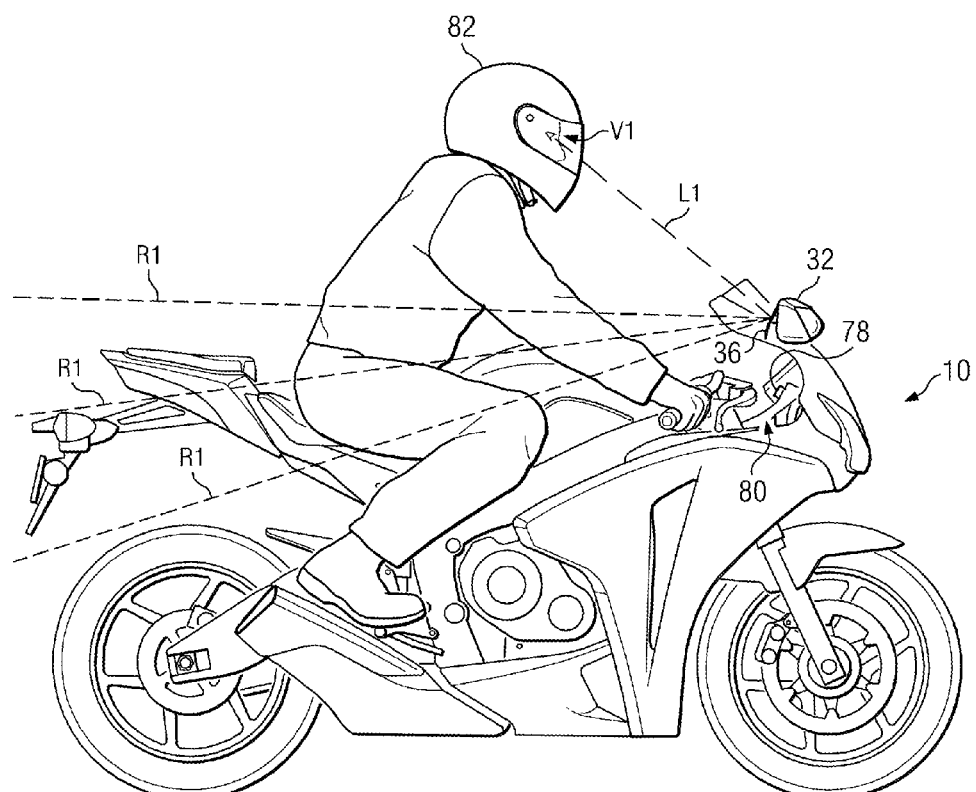
FIG. 7B is a right side elevational view depicting the motorcycle and the rider of FIG. 7A.
Figure 8A:
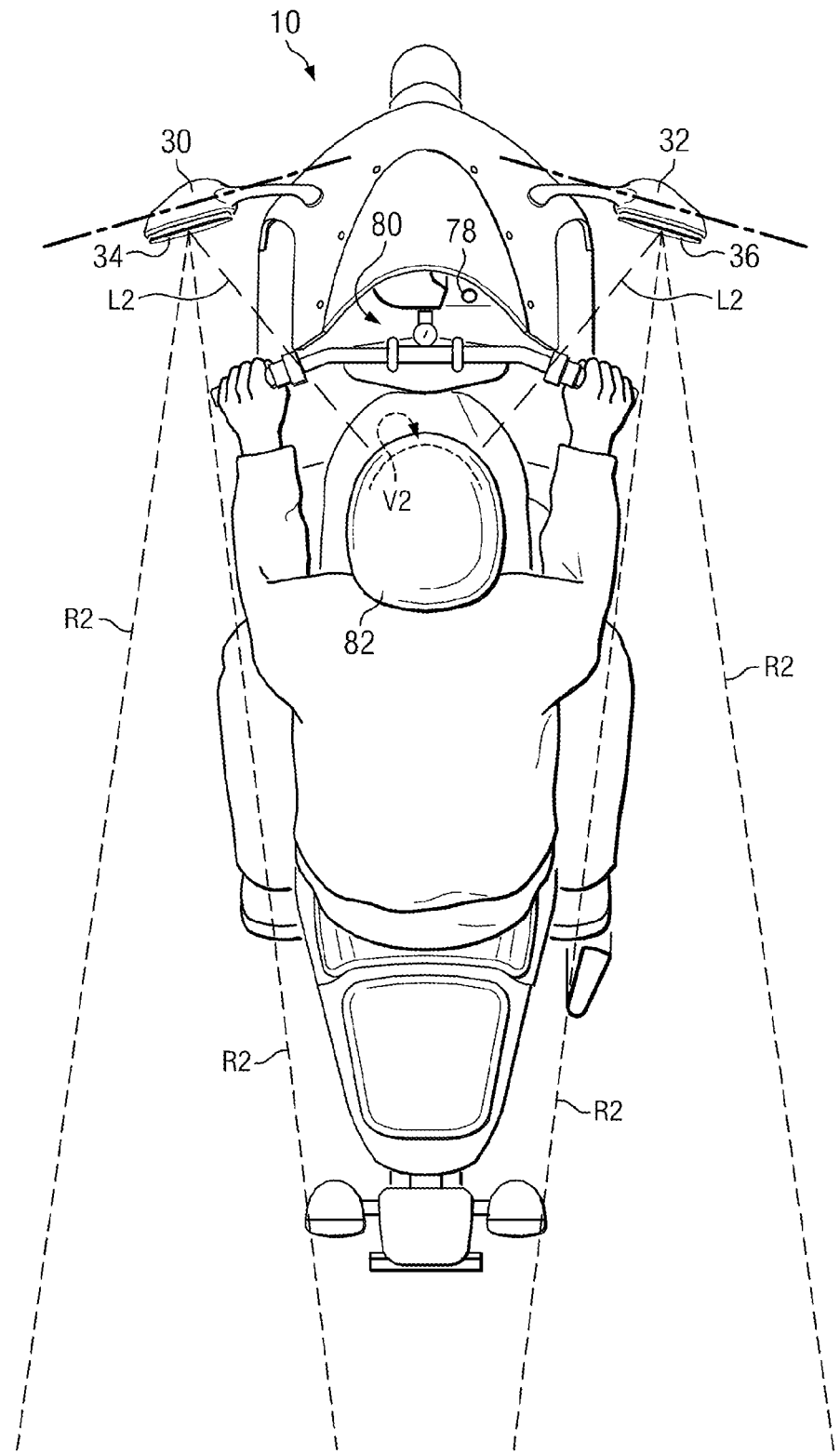
FIG. 8A is a top plan view depicting the motorcycle of FIG. 1 in association with a rider, wherein the rider is positioned on the seat of the motorcycle in a tucked position, the left and right mirror housings are each in a respective inward position, and the left and right mirrors are each in a respective second position.
Figure 8B:
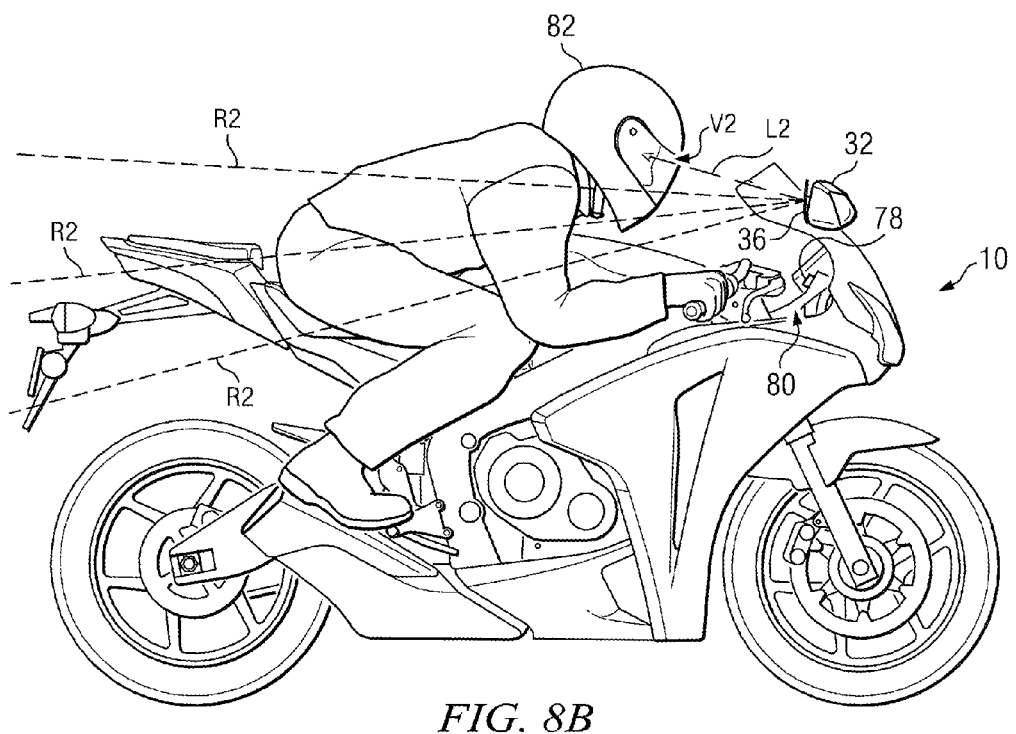
FIG. 8B is a side elevational view depicting the motorcycle and the rider of FIG. 8A.

During operation of the motorcycle 10, a rider can assume a variety of different riding positions. For example, a rider can move between an upright and a tucked position to accommodate for the speed of the motorcycle 10. When the motorcycle 10 is operating at lower speeds, the rider may be in an upright position, as illustrated in FIGS. 7A and 7B, such that the rider is sitting forwardly on the seat 24 with her head above the windshield 21. However, when the motorcycle 10 is operating at higher speeds, the rider may be in a tucked position, as illustrated in FIGS. 8A and 8B, such that the rider is sitting rearwardly on the seat 24 with her head tucked behind the windshield 21.

It will be appreciated that, when the riding position of the rider changes, the rider's viewpoint to the left and right mirrors 34, 36 can also change, which can change the rider's line of sight to the left and right mirrors 34, 36. For example, when the rider is in an upright position, as illustrated in FIGS. 7A and 7B, the rider's viewpoint (e.g., V1) may be more elevated and further away from the left and right mirrors 34, 36 than the rider's viewpoint (e.g., V2) when the rider is in the tucked position, as illustrated in FIGS. 8A and 8B. Therefore, when the rider is in the upright position, the approach angle of the rider's line of sight (e.g., L1) to the left and right mirrors 34, 36 can be at a steeper angle than the approach angle of the rider's line of sight (e.g., L2) when the rider is in the tucked position.

In order to reflect the rider's line of sight (e.g., L1, L2 in FIGS. 7A, 7B, 8A, and 8B) properly to the rear of the motorcycle 10 when a rider changes position (e.g., to provide the rider with an appropriate view of the area rearward of the motorcycle 10 from the left and right mirrors 34, 36), the controller 70 can facilitate movement of the left and right mirror housings 30, 32 and/or the left and right mirrors 34, 36. In one embodiment, when the rider is in the upright position, the left and right mirror housings 30, 32 can be moved to outward positions (e.g., through operation of the left and right housing motors 42, 43) and the left and right mirrors 34, 36 can be moved to first positions (e.g., through operation of left and right actuators 54 and 57), as illustrated in FIGS. 7A and 7B. It will be appreciated that with the rider, the left and right mirror housings 30, 32 and the left and right mirrors 34, 36 in the positions shown in FIGS. 7A-7B, the line of sight (e.g., L1) of the rider can be reflected to the rear of the motorcycle 10 in a manner that provides a suitable view (e.g., R1) of the area rearward of the motorcycle 10 from the left and right mirrors 34, 36. Conversely, when the rider moves to the tucked position, the left and right mirror housings 30, 32 can be moved to inward positions and the left and right mirrors 34, 36 can be moved to second positions, as illustrated in FIGS. 8A and 8B. With the rider, the left and right mirror housings 30, 32, and the left and right mirrors 34, 36 in the positions shown in FIGS. 8A-8B, the line of sight (e.g., L2) of the rider can still be reflected in a direction that provides a suitable view (e.g., R2) of the area rearward the motorcycle 10 from the left and right mirrors 34, 36.

Therefore, during operation of the motorcycle 10, when the rider moves between the upright and tucked positions, the controller 70 can automatically move the left and right mirror housings 30, 32 and left and right mirrors 34, 36 to provide a sufficient view of the area rearward of the motorcycle 10 from either position without requiring a rider to manually manipulate the position of the left and right assemblies 26, 28. In addition, movement of the left and right mirror housings 34, 36 can reduce the affect of aerodynamic drag during certain operations of the motorcycle 10. For example, when a rider moves to the tucked position, thereby reducing her affect upon aerodynamic drag on the motorcycle 10, the left and right mirror housings 30, 32 can correspondingly move inwardly to further reduce their affect upon aerodynamic drag on the motorcycle 10. Moreover, while conventional mirror assemblies can be oversized to provide a sufficient view of the rearward area for a range of different rider positions, the left and right mirror housings 30, 32 and left and right mirrors 34, 36 can accommodate for different rider positions through automatic movement, and can accordingly be smaller than some conventional mirror assemblies, which can improve the aerodynamics of the motorcycle 10, decrease the weight of the motorcycle 10, and provide more attractive aesthetics.

In one embodiment, when the rider moves from one of the upright and tucked positions, the controller 70 can maintain the positions of the left and right mirror housings 30, 32 and the left and right mirrors 34, 36 until the rider fully completes her move into the new position. For example, if the left and right mirror housings 30, 32 are in their outward positions with the left and right mirrors 34, 36 in their first positions, the controller 70 might not move the left and right mirror housings 30, 32 to their inward positions or the left and right mirrors 34, 36 to their second positions until the rider assumes the tucked position (e.g., illustrated in FIGS. 8A and 8B). In another embodiment, the controller 70 can maintain the positions of the left and right mirror housings 30, 32 and the left and right mirrors 34, 36 until the position of the rider crosses an intermediate threshold between the upright and tucked positions. For example, if the left and right mirror housings 30, 32 are in their outward positions with the left and right mirrors 34, 36 in their first positions, the controller 70 might not move the left and right mirror housings 30, 32 to their inward positions or the left and right mirrors 34, 36 to their second positions until the rider is positioned closer to the tucked position than to the upright position.

It will be appreciated that, in such an embodiment, the controller 70 can be configured to facilitate operation of mirror housings and/or mirrors in any of a variety of suitable arrangements. In one embodiment, the controller 70 can position the left and right mirror housings 30, 32 and the left and right mirrors 34, 36 according to the absolute position of the rider. Therefore, as the position of the rider changes, the positions of the left and right mirror housings 30, 32 and the left and right mirrors 34, 36 can correspondingly change to follow the rider. In another embodiment, the controller 70 can move the left and right mirror housings 30, 32 and the left and right mirrors 34, 36 according to the leftward or rightward leaning position of the rider. In such an embodiment, the left and right mirror housings 30, 32 and the left and right mirrors 34, 36 can move independently from one another. Therefore, if a rider leans to the right, the left mirror housing 30 can move inwardly and the right mirror housing 32 can move outwardly. Similarly, when the rider leans to the right, the right mirror 36 may move outwardly and downwardly while the left mirror 34 may move inwardly and upwardly. It will also be appreciated that, in one embodiment, the controller 70 can facilitate movement of the left and right mirrors 34, 36 in response to the position of the rider, and without moving the left and right mirror housings 30, 32 (e.g., the left and right mirror housings 30, 32 can be fixed relative to the body structure 16). Alternatively, in another embodiment, the controller 70 can facilitate movement of the left and right mirror housings 30, 32 in response to the position of the rider, and without moving the left and right mirrors 34, 36 (e.g., the left and right mirrors 34, 36 can be fixed relative to the respective left and right mirror housings 30, 32).

Figure 9:
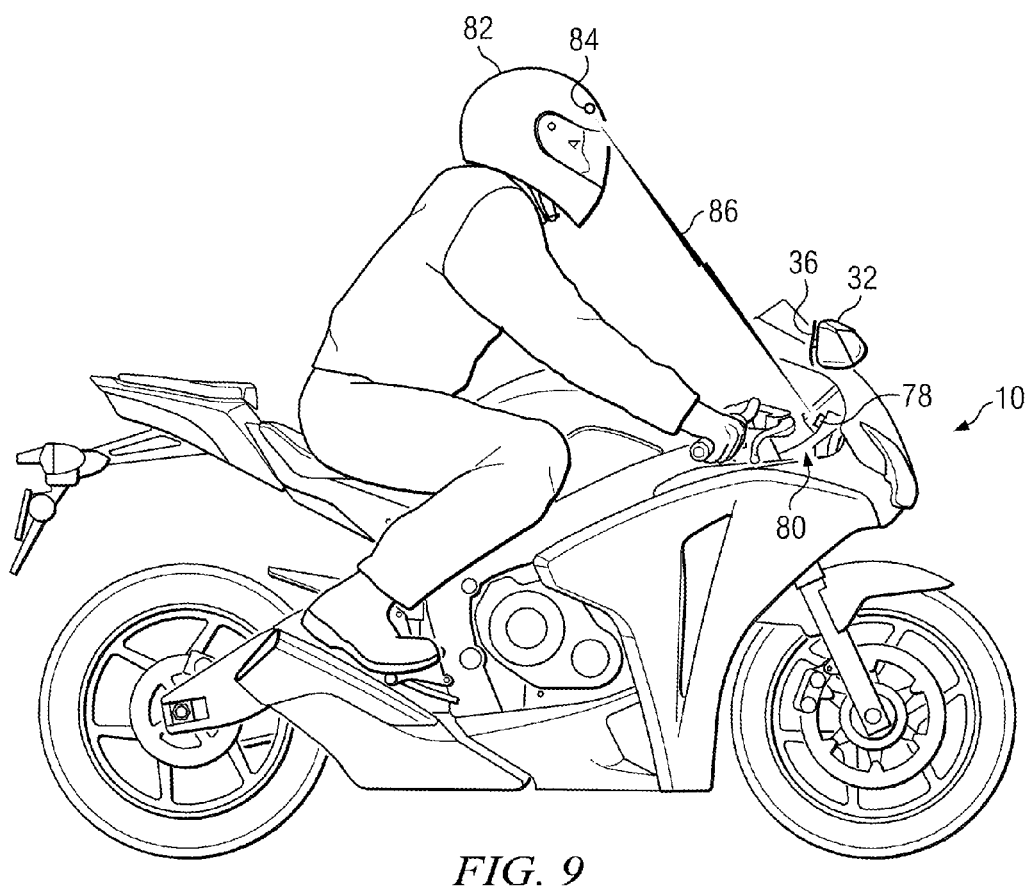
FIG. 9 is a side elevational view of the motorcycle of FIG. 1 in association with a rider, wherein the rider is positioned on a seat and is wearing a protective helmet that includes a transmitter.

In one embodiment, the controller 70 can be configured to detect a position of the rider by monitoring the position of the rider's head. For example, as illustrated in FIG. 9, a protective helmet 82 of a rider can be provided with a transmitter 84 that is configured to emit a position signal 86 to the position sensor 78 and, by monitoring the strength of the position signal 86 received by the position sensor 78, the controller 70 can identify the position of the rider's head. By detecting a position of a rider's head, the rider's eye position can be approximated.

In one embodiment, the protective helmet 82 can include a battery (not shown) to remotely power the transmitter 84. In one embodiment, the position sensor 78 can be a radio frequency identification (RFID) reader and the transmitter 84 can be a passive or active RFID transmitter configured to emit a radio frequency signal. In such an embodiment, the transmitter 84 can be uniquely identified by the controller 70 (e.g., through addressing) such that any adjacent transmitters (e.g., from an adjacent motorcycle) do not interfere with the transmitter 84 and position sensor 78. It will be appreciated however, that the position detector 78 and the transmitter 84 can be any of a variety of suitable alternative arrangements that facilitate transmission of a position signal to facilitate detection of a head position.

In one alternative embodiment, the position sensor 78 and the controller 70 can be configured to detect a position of a rider through image processing, such as is utilized for conventional image based occupant classification systems in airbag deployment control. For example, an infrared light source, such as an infrared light emitting diode array (not shown) can be provided along an instrument panel 80 of the motorcycle 10. The position sensor 78 can comprise an infrared camera such as a charge coupling device (CCD). The infrared light source can emit infrared light to the rider and the position sensor 78 can receive the reflected infrared light from the rider. The controller 70 can then analyze the reflected infrared light to determine the position of the rider.

In another embodiment, the position sensor 78 can comprise a radar unit. In such an embodiment, the position sensor 78 can emit a radar signal towards the rider, and can receive the reflected radar pattern. The controller 70 can analyze the reflected radar pattern to determine the position of the rider. In yet another embodiment, the position sensor 78 can comprise an ultrasonic transducer. It will accordingly be appreciated that the controller 70 can be configured to detect a position of a rider's head without requiring attachment of a transmitter to a rider. It will also be appreciated that any of a variety of other technologies or arrangements can be used to detect a rider's position and that a vehicle can include one or more position sensors provided in any of a variety of suitable locations upon a vehicle. For example, a plurality of position sensors can be provided at a variety of positions along the instrument panel 80 to improve the integrity of the position data and enable more effective detection of a rider's head location. In one embodiment, a position sensor (such as position sensor 178 illustrated in FIG. 5) can be attached to a left and right mirror housing (e.g., left mirror housing 130) such that the left and right side mirror assemblies can be self-contained position detection units. In such an embodiment, the left and right mirrors (e.g., 134) can each define an aperture (e.g., 179 in FIG. 5) that permits the position sensor (e.g., 178) to sense position data though the mirror (e.g., 134).

Although the detection of the position of a rider has been described with respect to detecting a position of the rider's head, it will be appreciated that the position of a rider can be alternatively detected by monitoring other portions of the rider, and such as through use of detection techniques described above. For example, a transmitter can be integrated into a rider's clothing such that the position of a rider's torso can be monitored. In another embodiment, a position detector can comprise an eye gaze detector to monitor the location and direction of a rider's eyes. In addition, it will be appreciated that different detection techniques can be used in combination upon a vehicle such as to enhance rider position detection or for redundancy during failure of a primary detection technique.

A controller can be provided upon a vehicle in any of a variety of suitable locations and configurations. For example, the controller 70 can be a stand alone device or its functionality can alternatively be integrated into an engine control unit (ECU) or other electronic control unit upon the vehicle. It will also be appreciated that the controller can be configured to implement any of a variety of suitable control routines and/or functionalities. In one embodiment, the controller 70 can be configured to allow a rider to briefly override position detection and resultant control over the left and right side mirror assemblies 26, 28, such as to permit a rider to view a wider rear area from the left and right mirrors 34, 36. For example, when a rider abruptly moves her head upwardly, the controller 70 can move the left and right mirrors 34, 36 to an alternate position momentarily and then back to the original position.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle comprising:
   a body structure;
   a first mirror assembly comprising:
      a first mirror housing;
      a first housing motor operably coupled with the first mirror housing and the body structure, the first housing motor being configured to facilitate movement of the first mirror housing with respect to the body structure; and
      a first mirror coupled with the first mirror housing;
   a controller in electrical communication with the first housing motor;
   a position sensor in communication with the controller and configured to sense position data relating to a rider of the vehicle;
   wherein the controller is configured to detect a position of a rider from the position data and to facilitate selective operation of the first housing motor to result in movement of the first mirror housing to correspond with the detected position of the rider.

2. The vehicle of claim 1 wherein the first mirror assembly further comprises a first mirror actuator operably coupled with the first mirror housing and the first mirror, the first mirror actuator being configured to facilitate movement of the first mirror with respect to the first mirror housing, and wherein the controller is in electrical communication with the first mirror actuator and is configured to facilitate selective operation of the first mirror actuator to result in movement of the first mirror to correspond with the detected position of the rider.

3. The vehicle of claim 2 wherein:
   the first mirror housing is movable relative to the body structure between an outward position and an inward position; and
   the first mirror is movable relative to the first mirror housing between a first position and a second position;
   the controller is configured to detect an upright position and a tucked position of a rider from the position data;
   the controller is configured to facilitate selective operation of the first housing motor and the first mirror actuator to result in movement of each of the first mirror housing and the first mirror to the respective outward position and the first position, to correspond with the detected upright position of the rider; and
   the controller is configured to facilitate selective operation of the first housing motor and the first mirror actuator to result in movement of each of the first mirror housing and the first mirror to the respective inward position and the second position, to correspond with the detected tucked position of the rider.

4. The vehicle of claim 2 wherein the first mirror actuator comprises a piezoelectric actuator.

5. The vehicle of claim 4 wherein the piezoelectric actuator is configured to dampen ambient vibration of the first mirror housing from being transmitted to the first mirror.

6. The vehicle of claim 4 wherein the piezoelectric actuator is further configured to harvest energy.

7. The vehicle of claim 2 wherein the controller is configured to facilitate selective independent operation of the first housing motor and the first mirror actuator.

8. The vehicle of claim 1 further comprising:
   a second mirror assembly comprising:
      a second mirror housing;
      a second housing motor operably coupled with the second mirror housing and the body structure, the second housing motor being configured to facilitate movement of the second mirror housing with respect to the body structure; and
      a second mirror coupled with the second mirror housing;
   wherein:
      the controller is further in electrical communication with the second housing motor; and
      the controller is further configured to facilitate selective operation of the second housing motor to result in movement of the second mirror housing to correspond with the detected position of the rider.

9. The vehicle of claim 8 wherein the first mirror assembly comprises a right side mirror assembly and the second mirror assembly comprises a left side mirror assembly.

10. The vehicle of claim 1 wherein the controller is configured to detect a position of a rider's head from the position data.

11. The vehicle of claim 1 comprising a motorcycle.

12. A saddle-type vehicle comprising:
   a body structure;
   a mirror assembly comprising:
      a mirror housing;
      a housing motor operably coupled with the mirror housing and the body structure, the housing motor being configured to facilitate movement of the mirror housing with respect to the body structure;
      a mirror; and
      a mirror actuator operably coupled with the mirror housing and the mirror, the mirror actuator being configured to facilitate movement of the mirror with respect to the mirror housing;

a controller in electrical communication with each of the housing motor and the mirror actuator;

a transmitter configured for coupling with a rider and further configured to emit a position signal; and a position sensor in electrical communication with the controller and configured to receive the position signal;

wherein the controller is configured to detect a position of a rider of the saddle-type vehicle from the position signal and to facilitate selective operation of at least one of the housing motor and the mirror actuator to result in movement of at least one of the mirror housing and the mirror to correspond with the detected position of the rider.

13. The saddle-type vehicle of claim 12 wherein the controller is configured to facilitate simultaneous operation of each of the housing motor and the mirror actuator to result in movement of the mirror housing and the mirror to correspond with the detected position of the rider.

14. The saddle-type vehicle of claim 12 wherein the transmitter is attached to a protective helmet of the rider and the controller is configured to detect a position of a head of the rider from the position signal.

15. The saddle-type vehicle of claim 14 wherein:

the mirror housing is movable relative to the body structure between an outward position and an inward position; and the mirror is movable relative to the mirror housing between a first position and a second position;

the controller is configured to detect an upright position and a tucked position of the rider from the position signal;

the controller is configured to facilitate selective operation of the housing motor and the mirror actuator to result in movement of each of the mirror housing and the mirror to the respective outward position and the first position, to correspond with the detected upright position of the rider; and the controller is configured to facilitate selective operation of the housing motor and the mirror actuator to result in movement of each of the mirror housing and the mirror to the respective inward position and the second position, to correspond with the detected tucked position of the rider.

16. The saddle-type vehicle of claim 12 wherein the mirror assembly comprises one of a right side mirror assembly and a left side mirror assembly.

17. The saddle-type vehicle of claim 12 wherein the transmitter comprises an RFID transmitter and the position sensor comprises an RFID reader.

18. The saddle-type vehicle of claim 12 wherein the housing motor is configured to facilitate pivotal movement of the mirror housing with respect to the body structure.

19. A method for positioning a mirror assembly of a saddle-type vehicle, the method comprising:

sensing position data relating to a rider of the saddle-type vehicle;

detecting a position of the rider from the position data;

operating a housing motor, the housing motor being operably coupled with a mirror housing and a body structure; and operating a mirror actuator, the mirror actuator being operably coupled with the mirror housing and a mirror;

wherein said operating of the housing motor and the mirror actuator occurs in automatic response to detection of a change of position of the rider.

20. The method of claim 19 wherein said detecting a position of the rider from the position data comprises detecting a position of a protective helmet of the rider.

* * * * *